United States Patent
Kalker et al.

[11] Patent Number: 5,999,655
[45] Date of Patent: Dec. 7, 1999

[54] METHOD AND APPARATUS FOR TRANSMISSION OF VIDEO PICTURES WHICH ARE SEGMENTED TO FORM MAPS OF PICTURE BLOCKS OF VARIABLE BLOCK SIZES

[75] Inventors: Antonius A. C. M. Kalker; Rob A. Beuker, both of Eindhoven; Hendrik G. J. Theunis, Velserbroek, all of Netherlands

[73] Assignee: U.S. Philips Corporation, New York, N.Y.

[21] Appl. No.: 08/891,605

[22] Filed: Jul. 11, 1997

[30] Foreign Application Priority Data

Jul. 11, 1996 [EP] European Pat. Off. .............. 96201960

[51] Int. Cl.[6] ........................................... G06K 9/36
[52] U.S. Cl. ........................ 382/234; 382/239; 382/245; 382/246
[58] Field of Search ....................... 382/232, 233, 382/240, 244, 245, 246, 226, 234, 239; 341/65, 67, 59; 358/427, 261.1; 348/384

[56] References Cited

U.S. PATENT DOCUMENTS

| | | | |
|---|---|---|---|
| 5,021,891 | 6/1991 | Lee | 382/250 |
| 5,060,285 | 10/1991 | Dixit et al. | 382/240 |
| 5,228,098 | 7/1993 | Crinon et al. | 382/240 |
| 5,241,395 | 8/1993 | Chen | 358/261 |
| 5,321,776 | 6/1994 | Shapiro | 382/240 |
| 5,452,104 | 9/1995 | Lee | 358/433 |
| 5,724,451 | 3/1998 | Shin et al. | 382/240 |
| 5,734,755 | 3/1998 | Ramchandran et al. | 382/250 |
| 5,740,277 | 4/1998 | Katto | 382/240 |
| 5,764,807 | 6/1998 | Pearlman et al. | 382/240 |
| 5,768,434 | 6/1998 | Ran | 382/240 |
| 5,778,192 | 7/1998 | Schuster et al. | 395/200.77 |

FOREIGN PATENT DOCUMENTS

0220706A2 5/1987 European Pat. Off. ......... H04N 1/41

Primary Examiner—Matthew C. Bella

[57] ABSTRACT

An advanced video compression coding system which employs variable block size transforms to improve the compression efficiency for transmission of video pictures. A picture block segmentation map is transmitted as a one-dimensional series of block-size codes by scanning the segmentation map in accordance with a predetermined scanning pattern and on the basis of block size. A block-size code is skipped when the scanning pattern intersects a block which has already been scanned earlier. The series of block-size codes is then run-length and Huffman-coded before being transmitted.

18 Claims, 5 Drawing Sheets

METHOD AND APPARATUS FOR TRANSMISSION OF VIDEO PICTURES WHICH ARE SEGMENTED TO FORM MAPS OF PICTURE BLOCKS OF VARIABLE BLOCK SIZES

The invention relates to a method of transmitting encoded video pictures, comprising the steps of segmenting each picture into a map of picture blocks having variable block sizes, encoding said segmentation map, encoding the image contents of each picture block into coded picture data, and transmitting said coded picture data and coded segmentation map. The invention also relates to a method of receiving encoded pictures and arrangements for carrying out said methods.

BACKGROUND OF THE INVENTION

Advanced video compression systems are based on variable-size transforms to improve the compression factor. Each picture is segmented into picture blocks, the size of which is adapted to local picture contents. The segmentation must be transmitted to the receiver to allow it to apply a backward transform to the same blocks as those used by the encoder.

A known method of transmitting a segmentation map is disclosed in U.S. Pat. No. 5,241,395. Herein, the segmentation map is quadtree-encoded. A logic bit value '1' or '0' is assigned to each node of the quadtree-depending on whether or not the block which is associated with said node is further divided into smaller blocks. Small blocks have a plurality of higher level nodes and thus require many bits. Moreover, quadtree coding is limited to square blocks only.

An alternative method of transmitting video pictures based on a variable block-size segmentation is disclosed in European Patent application EP-A 0 220 706. Herein, the segmentation map is not separately transmitted. A special picture data codeword (ESC) identifies blocks which are divided into smaller blocks. The coded picture data for the smaller blocks are transmitted at a lower level.

SUMMARY OF THE INVENTION

It is an object of the invention to provide a more efficient method of transmitting the segmentation map.

In accordance with the invention, the method is characterized in that the step of encoding said segmentation map comprises assigning a block-size code to each block size and scanning the segmentation map in accordance with a predetermined scanning pattern to obtain a one-dimensional series of block-size codes. It is thereby achieved that only block-size codes are transmitted for blocks which are not divided into smaller blocks. As there are few different block sizes (e.g. 4*4, 8*8 and 16*16), the overhead for transmitting the segmentation map is relatively small. The method is also applicable if the blocks are not square. Advantageously, the series of block-size codes is runlength-encoded. Runlength encoding is efficient because smaller blocks always appear at least in pairs.

A further embodiment is characterized by linearly combining each block-size code and at least one previous block-size code of said series, using integral weighting coefficients, for forming a series of differential block-size codes. The variance in values to be transmitted is thereby decreased, which improves the coding efficiency considerably. The use of integer weighting coefficients provides lossless conversion into differential block-size codes. Many differential block-size codes will assume the value of zero. Preferably, runs of zeros of said differential block-size codes are runlength-encoded.

Advantageously, the segmentation map is alternately scanned in opposite directions, such as from left to right and vice versa. Runlength-encoding then benefits from the frequent occurrence of vertically adjacent blocks of the same size at the picture sides.

A corresponding method of receiving encoded video pictures comprises the step of allocating a picture block to each block-size code, the size of the allocated block being determined by the block size code and the position being in conformity with the predetermined scanning pattern.

DETAILED DESCRIPTION OF THE PREFERRED EMBODIMENTS

Figure 1:
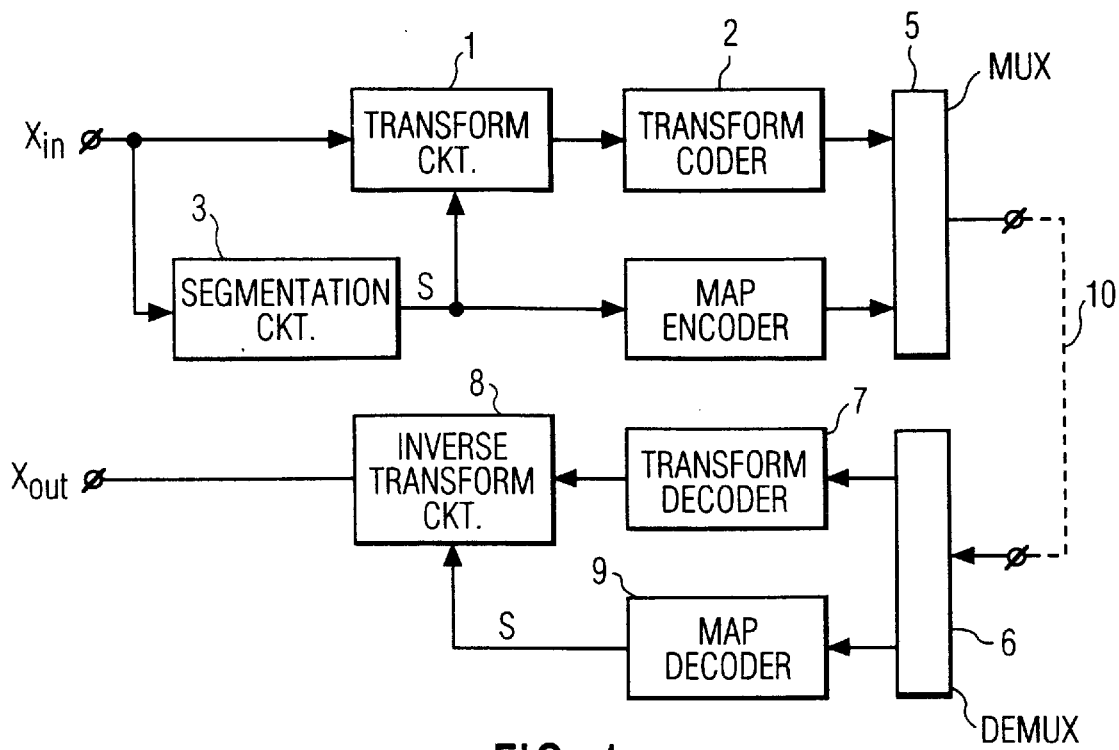
FIG. 1 shows a schematic diagram of a system comprising a video transmitting station and a video-receiving station employing the method according to the invention.

FIG. 1 shows a schematic diagram of a system comprising a video-transmitting station and a video-receiving station employing the method according to the invention. The transmitting station receives an input signal $X_{in}$ to be encoded. The input signal $X_{in}$ may be a video picture or a part thereof (for example, a given object). The input signal may also be the difference between an applied signal and a (possibly motion-compensated) prediction therefor. The input signal is applied to a transform circuit 1 which subjects picture blocks having a variable block size S to a picture transform. In the present example, the block size is 4*4, 8*8 or 16*16 pixels. The transform coefficients are quantized and the quantized coefficients are lossless coded by a quantizer and entropy coder 2. Transform, quantization and entropy coding are well-known in the art. For example, MPEG2-like coding based on Discrete Cosine Transform (DCT) can be used. A particularly advantageous transform is the Lapped Orthogonal Transform (LOT) or a modified version thereof (MLOT).

The input signal $X_{in}$ is further applied to a segmentation circuit 3 which determines which block size is locally optimal in a rate-distortion sense. The actual method of segmentation is not relevant to the invention. Examples are disclosed in U.S. Pat. No. 5,241,395, EP-A 0 220 706 and Applicant's earlier filed patent application (PHN 15.521, not published yet). The plurality of variable-size blocks of a picture constitute a "segmentation map". This segmentation map is applied to transform circuit 1 to identify the current block size S. The segmentation map is also encoded for transmission or storage by an encoding circuit 4 which will be described hereinafter. The encoded transform coefficients and the encoded segmentation map are multiplexed by a multiplexer 5 and applied to a transmission channel or storage medium 10.

The receiving station comprises a demultiplexer 6 for separating the transform coefficients and the encoded segmentation map from the received signal. The transform coefficients are applied to an entropy decoder and inverse quantizer 7 which performs the inverse operations of quantizer and entropy coder 2. The decoded transform coefficients are applied to an inverse transform circuit 8 which generates an output signal $X_{out}$. The segmentation map is applied to a segmentation map decoder circuit 9 which applies the relevant block size S to the inverse transform circuit 8.

Figure 2:
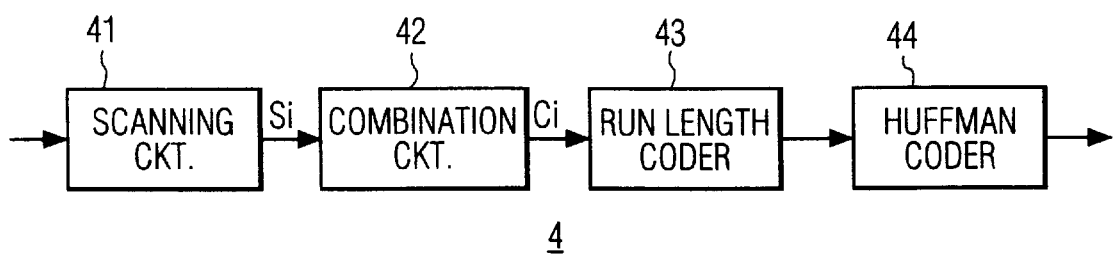
FIG. 2 shows a schematic diagram of a segmentation map-encoding circuit which is shown in FIG. 1.

FIG. 2 shows a schematic diagram of segmentation map-encoding circuit 4. The circuit comprises a scanning circuit 41, a linear combination circuit 42, a runlength coder 43 and a Huffman coder 44. The scanning circuit 41 scans the segmentation map on the basis of a grid corresponding to the smallest block size.

Figure 3:
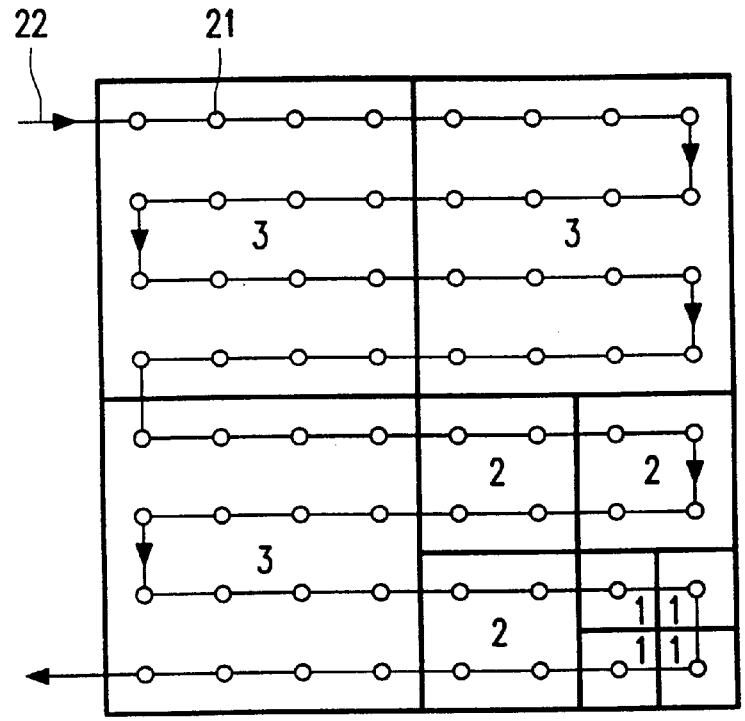
FIG. 3 shows an example of a segmentation map.

In one embodiment, the scanning order is alternately from left to right and from right to left and proceeds from top to bottom. FIG. 3 shows an example of a segmentation map. In this Figure, grid locations are denoted by reference numeral 21 and the scanning order is shown as a line 22 along the grid. Each block size is represented by a block-size code S. In the present example, S=1 for 4*4 blocks, S=2 for 8*8 blocks and S=3 for 16*16 blocks. Note that blocks larger than 4*4 are intersected more than once by the scanning pattern.

Figure 4:
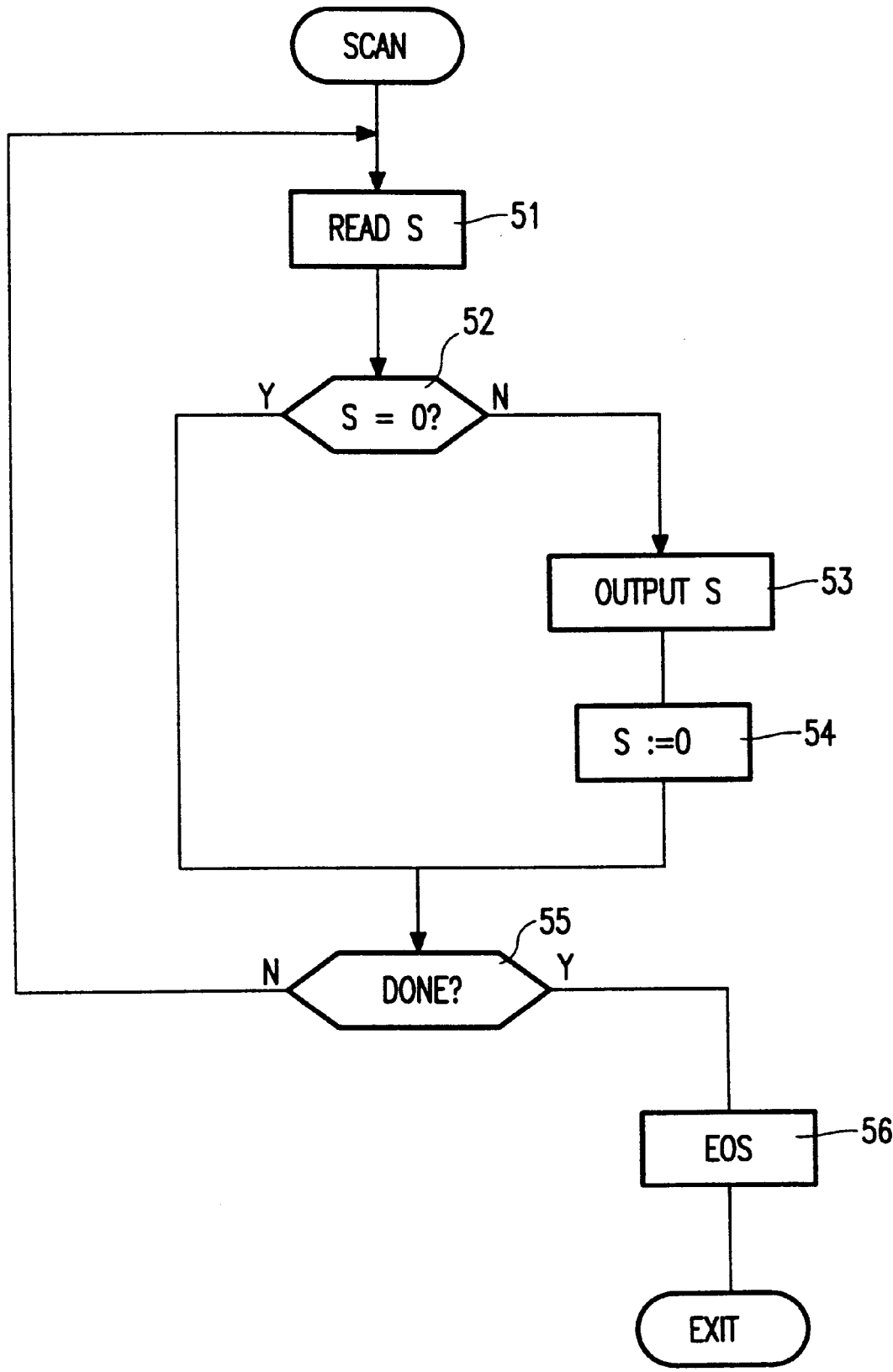
FIG. 4 shows a flow chart illustrating the operation of the segmentation map-encoding circuit which is shown in FIG. 3.

FIG. 4 shows a flow chart illustrating the scanning process in more detail. The block size S at the current grid location is read in a step 51. In a step 52, it is checked whether S=0. If the scanning pattern intersects a block for the first time, the size S has one of the values 1, 2 or 3. The value S is then applied to the output (step 53). In a subsequent step 54, the value S=0 is assigned to all grid locations within the current picture block to indicate that the block size has already been scanned. In a step 55, it is checked whether the scan has been done. As long as this is not the case, the scan proceeds to the next grid location. If the next grid location is within a block already scanned, then S=0 (step 52) and outputting the block size is skipped. If the scan is completed, an end-of-scan code EOS is applied to the output (step 56).

Applying the above scanning strategy to the segmentation map shown in FIG. 3 yields the following sequence of block sizes:

3,3,3,2,2,2,1,1,1,1,EOS.

Fixed-length coding of the elements of this sequence with 2 bits per element requires 22 bits. Runlength encoding of the sequence is more efficient. Encoded in runlength pairs {size,length}, the above sequence could be represented as:

{3,3}{2,3}{1,4}EOS

In the embodiment shown in FIG. 2, a linear combination circuit 42 precedes the runlength coder. The linear combination circuit forms a linear combination $C_i$ of each block-size code $S_i$ and one or more previous block-size codes $S_{i-1}$, $S_{i-2}$, ... using integral weighting coefficients. In the present example, the circuit forms the difference between two successive block size codes: $C_i = S_i - S_{i-1}$. This yields the sequence:

3,0,0,−1,0,0,−1,0,0,0,EOS

Runlength encoding is then applied to the differential block-size codes. In the present embodiment, runlength coder 43 is adapted to apply runlength-encoding to runs of zeros only. Since large homogeneous regions can be expected in real video pictures, long runs of zeros have a high probability. The sequence delivered by linear combination circuit 42 is thus encoded as:

3,2Z,−1,2Z,−1,3Z,EOS in which nZ denotes a run of n zeros.

This sequence is applied to Huffman coder 44 which encodes each element of the sequence into a variable-length codeword, taking account of the probability of occurrence of each element. Table I is an example of a Huffman codebook for the segmentation map shown in FIG. 3. Using this Table, the segmentation map is represented by the following bitstream:

{110}{00}{10}{00}{10}{01}{111}

The bitstream comprises 16 bits, which is to be compared with the 22 bits required for fixed-length coding of all individual indexes. In coding real video pictures, the saving is even more impressive.

TABLE I

| element | code |
|---------|------|
| 1Z | — |
| 2Z | 00 |
| 3Z | 01 |
| −1 | 10 |
| 1 | — |
| 2 | — |
| 3 | 110 |
| EOS | 111 |

Figure 5:
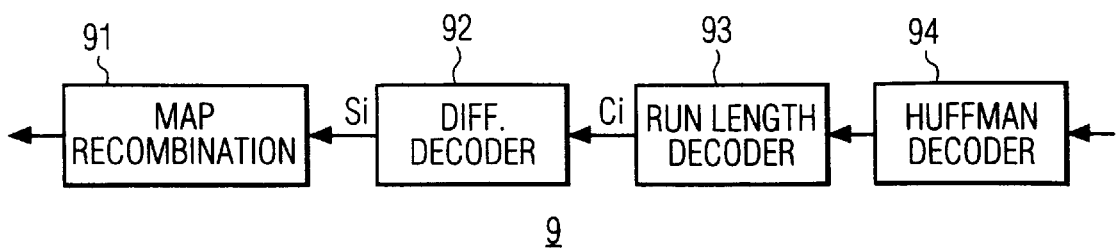
FIG. 5 shows a schematic diagram of a segmentation map-decoding circuit which is shown in FIG. 1.

FIG. 5 shows an example of the corresponding segmentation map-decoding circuit 9. The circuit comprises a Huffman decoder 94, a runlength decoder 93, and a differential decoder 92. In view of the detailed explanation of their respective counterparts (Huffman coder 44, runlength coder 43, and difference building circuit 42, respectively, in FIG. 3), these circuits need not be explained in further detail.

Figure 6:
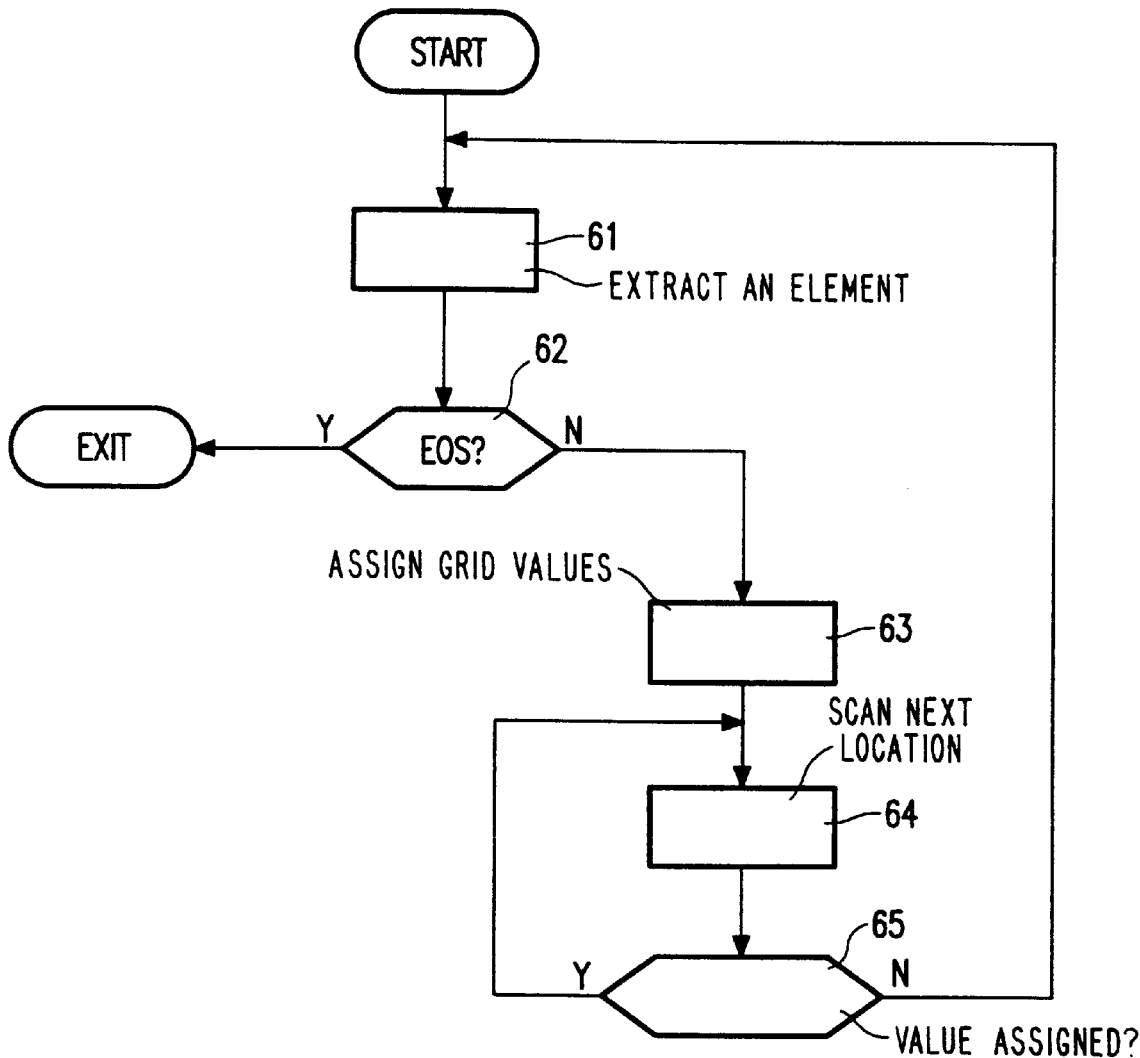
FIG. 6 shows a flow chart illustrating the operation of the segmentation map-decoding circuit which is shown in FIG. 5.

The decoded sequence of block-size codes S is applied to a segmentation map reconstruction circuit 91. This circuit comprises a segmentation map memory having a grid corresponding to the smallest block size (4*4 in the present example). The grid is scanned alternately from left to right and from right to left and proceeds from top to bottom. This scanning order corresponds to the scanning order in the encoder. The further operation of segmentation reconstruction circuit 91 will now be described with reference to FIG. 6 which shows a flow chart illustrating the reconstruction process in more detail. In a step 61, an element is extracted from the sequence. In a step 62, it is determined whether the element is the EOS code. If an element is not the EOS code, it represents a block size S. A step 63 is then carried out in which a block having a size defined by S is marked as having been processed, e.g. by assigning the value S to each grid location within said block. In a step 64, the scanning proceeds to the next grid location. In a step 65, it is determined whether this grid location has already been assigned a value. As long as this is the case, the process returns to step 64 so as to further proceed with the scan. If the memory location is still "virginal" (S=0), the process returns to step 61 so as to extract the next element from the sequence and mark (step 63) the corresponding memory area.

Figure 7:
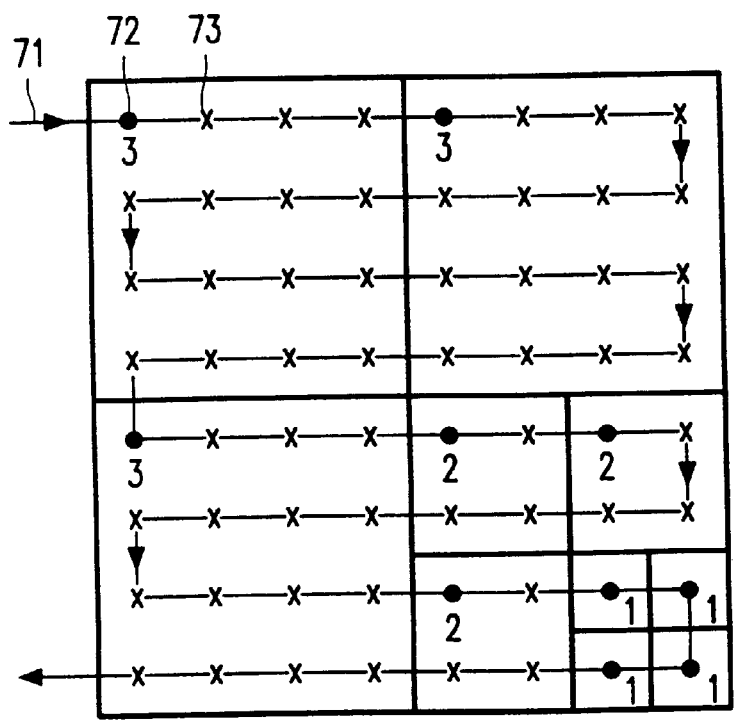
FIG. 7 shows a segmentation map which is reconstructed by the segmentation map-decoding circuit shown in FIG. 5.

FIG. 7 shows the segmentation map which is reconstructed in response to the sequence 3,3,3,2,2,2,1,1,1,1,EOS Line 71 in FIG. 7 indicates the scanning pattern. Numbered dots 72 along this line denote grid locations for which an element S is read from the sequence, and a memory area having the corresponding size is marked. Crosslets 73 along the line denote memory locations where the scanning process proceeds without further action.

An alternative embodiment of linear combination circuit 42 will now be given. Rather than forming the difference $D_i=S_i-S_{i-1}$ as in the above example, the circuit forms the linear combinations $D_i=2*S_i-S_{i-1}-S_{i-2}$. The corresponding decoder 92 then performs the operation $S_i=\frac{1}{2}(D_i+S_{i-1}+S_{i-2})$.

Figure 8:
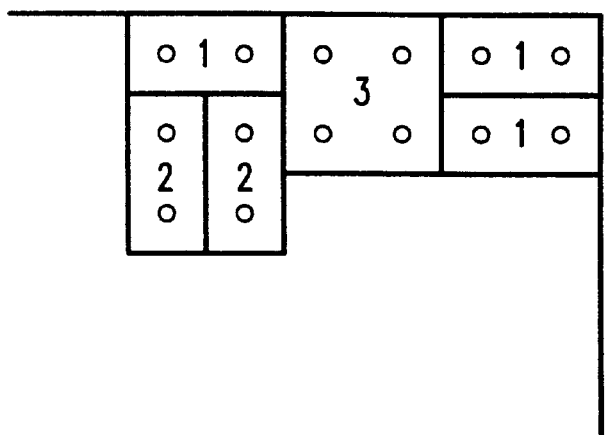
FIG. 8 shows a further example of a segmentation map of picture blocks which are not square.

FIG. 8 shows an example of a segmentation map to illustrate that the invention is also applicable if the picture blocks are not square. Only the top-right part of a segmentation map is shown. In the example, S=1 denotes 4*8 blocks, S=2 denotes 8*4 blocks and S=3 denotes 8*8 blocks. Scanning the map as described hereinbefore yields the following series of block-size codes S:

. . . ,1,3,1,1,2,2, . . .

The Fig. also illustrates that the particular scanning pattern (alternately from left to right and vice versa) is more efficient than a conventional scanning pattern (from left to right only). The conventional scanning pattern would yield the sequence:

. . . ,1,3,1,2,2,1, . . .

which, after differential runlength coding, comprises fewer runs of zeros and so will be Huffman coded less efficiently.

In a further embodiment of the scanning circuit 41 (see FIG. 2), the segmentation map is scanned on the basis of the largest block size. If a block comprises smaller blocks, it is scanned on the basis of the next smaller block size. This is an iterative process.

Figure 9:
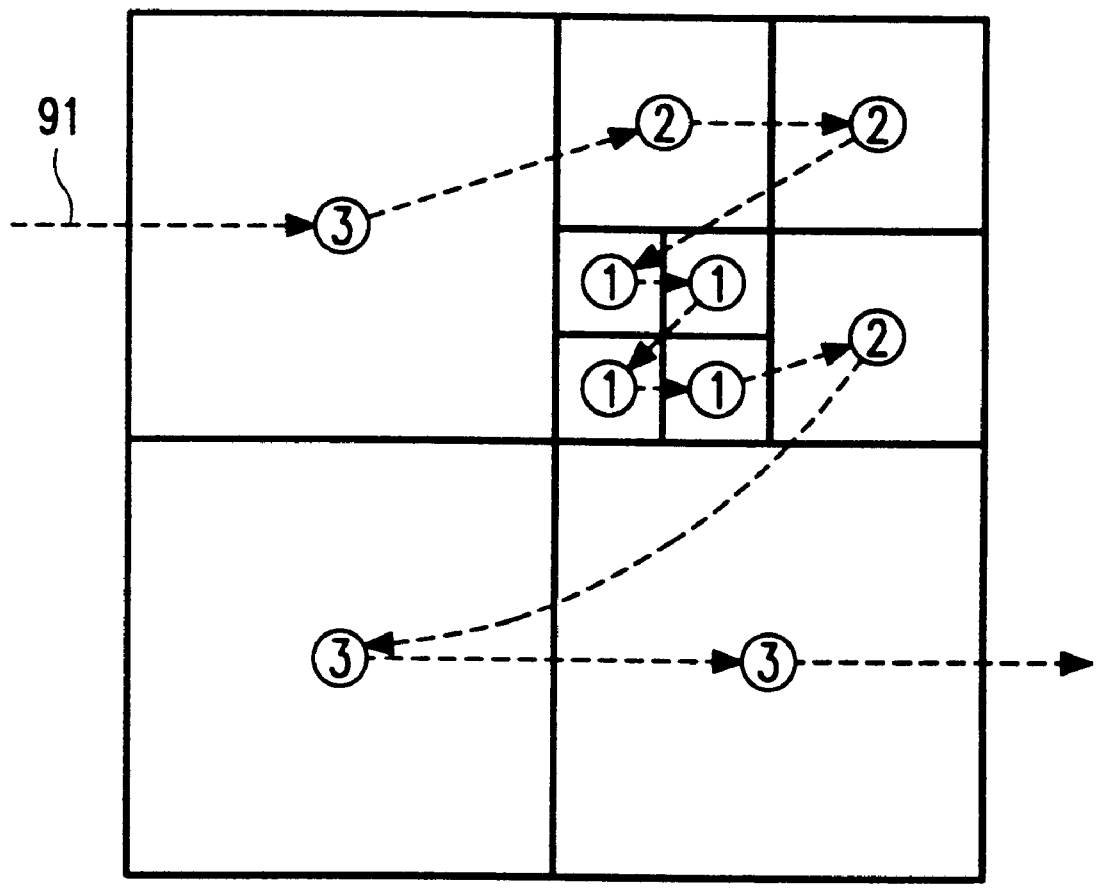
FIG. 9 shows a segmentation map illustrating a further embodiment of a scanning pattern.

FIG. 9 shows a segmentation map illustrating this embodiment. The scanning pattern is denoted 91 in this Figure. First, the top left 16*16 block is analyzed. As this block is not further divided into smaller blocks, the block size code S=3 is generated. Then, the next (top right) 16*16 block is analyzed. This block is segmented into smaller blocks and will now completely be scanned before proceeding to the next 16*16 block. More particularly, the top left 8*8 block is now analyzed. As it is not further divided, the block size code S=2 is generated. Similarly, the block size code S=2 is generated for the next (top right) 8*8 block. Then the bottom left 8*8 block is analyzed. It is segmented into smaller blocks and will thus be scanned before proceeding to the next 8*8 block. Accordingly, an S=1 block size code is generated for the top left 4*4 block, the top right 4*4 block, the bottom left 4*4 block and the bottom right 4*4 block, successively. The scanning then proceeds to the next (bottom right) 8*8 block for which, in this example, the block size code S=2 is produced. Now, the top right 16*16 block has completely been processed and the scanning proceeds to the left bottom 16*16 block (S=3) and the right bottom 16*16 block (S=3).

The above mentioned scanning pattern yields the following sequence of block size codes:

3,2,2,1,1,1,1,2,3,3,EOS

Due to concentration of the smaller block size codes, this sequence will be more efficiently encoded than the sequence obtained by the scanning pattern in accordance with the first embodiment. It should also be noted that it is now irrelevant in which order the largest blocks are scanned.

In summary, an advanced video coding system is disclosed, which employs variable-size transform to improve the compression efficiency. The segmentation map is transmitted as a one-dimensional series of block-size codes by scanning the segmentation map in accordance with a predetermined scanning pattern on the basis of the smallest block size. A block-size code is skipped when the scanning pattern intersects a block which has already been scanned earlier (most blocks are larger than the grid). The series of block-size codes is then run-length and Huffman-coded.

We claim:

1. A method of transmitting encoded video pictures, comprising the steps of:

segmenting each picture into a map of picture blocks having variable block sizes;

encoding said segmentation map;

encoding the image contents of each picture block into coded picture data; and transmitting said coded picture data and coded segmentation map; characterized in that the step of encoding said segmentation map comprises assigning a block-size code to each block-size and scanning the segmentation map in accordance with a predetermined scanning pattern to obtain a one-dimensional series of block-size codes.

2. A method as claimed in claim 1, wherein said series of block-size codes is runlength-encoded.

3. A method as claimed in claim 1, further comprising the step of linearly combining each block-size code with at least one previous block-size code of said series, using integral weighting coefficients, so as to form a series of differential block-size codes.

4. A method as claimed in claim 3, wherein runs of zeros of said differential block-size codes are runlength-encoded.

5. A method as claimed in claim 2, wherein the runlengths are subjected to Huffman coding.

6. A method as claimed in claim 1, wherein the scanning is based on a grid of the smallest block size, the scanning pattern being alternately in opposite directions after each scan of said segmentation map.

7. A method as claimed in claim 1, wherein the scanning is based on a grid of the largest block size, the scanning pattern being such that a block of current size is first scanned for segmenting into smaller blocks before proceeding to a next block of the current size.

8. A method of receiving encoded video pictures, comprising the steps of:

receiving and decoding a segmentation map defining segmentation of each picture into picture blocks having variable block sizes; and receiving and decoding coded picture data for each of said picture blocks;

characterized in that the received segmentation map is in the form of a one-dimensional series of block-size codes, and said segmentation map is decoded by allocating a picture block to each block-size code, the size of the allocated block being determined by the block-size code and the position of the allocated block being in conformity with a predetermined scanning pattern of said segmentation map.

9. A method as claimed in claim 8, wherein the received segmentation map is in the form of a series of runlength-encoded block-size codes, and further comprising the step of decoding said runlengths to obtain said one-dimensional series of block-size codes.

10. A method as claimed in claim 8, wherein the received segmentation map is in the form of a series of differential block-size codes, and further comprising the step of decoding said differential block-size codes to obtain said one-dimensional series of block-size codes.

11. A method as claimed in claim 10, wherein runs of zeros of said differential block-size codes are runlength-encoded, and further comprising the step of decoding said runlengths to obtain the series of differential block size codes.

12. A method as claimed in claim 9, wherein the runlengths are Huffman-coded, and further comprising the step of decoding said Huffman codes.

13. A method as claimed in claim 8, wherein the scanning is based on a grid of the smallest block size, the scanning pattern being alternately reversed in direction after each scan of said segmentation map.

14. A method as claimed in claim 8, wherein the scanning is based on a grid of the largest block size, the scanning pattern being such that a block of current size is first scanned for segmenting into smaller blocks before proceeding to a next block of the current size.

15. An apparatus for transmitting encoded video pictures, comprising:

means for segmenting each video picture into a map of picture blocks having variable block sizes;

means for encoding said segmentation map;

means for encoding the image contents of each picture block into coded picture data; and means for transmitting said coded picture data and said encoded segmentation map;

characterized in that the means for encoding said segmentation map are adapted to:

assign a block-size code to each block size; and scan the segmentation map in accordance with a predetermined scanning pattern to obtain a one-dimensional series of block-size codes of said picture blocks.

16. An apparatus for receiving encoded video pictures, comprising:

means for receiving and decoding a segmentation map defining a segmentation of each picture into picture blocks having variable block sizes; and means for receiving and decoding coded picture data for each of said picture blocks;

characterized in that the received segmentation map is in the form of a one-dimensional series of block-size codes, and decoding of said segmentation map is performed by allocating a picture block to each block-size code, the size of an allocated block being determined by the block-size code and the position thereof being according to a predetermined scanning pattern of said segmentation map.

17. An encoded video signal which includes (i) a segmentation map defining a segmentation of each of successive video pictures into picture blocks having variable block sizes, and (ii) coded picture data for each picture block; characterized in that the segmentation map is encoded in the form of a one-dimensional series of block-size codes, the size of each block being determined by the applicable block-size code and the position of each block being in accordance with a predetermined scanning pattern of the segmentation map.

18. A storage medium in which a video signal as claimed in claim 17 is stored.

* * * * *